(12) United States Patent
Park et al.

(10) Patent No.: US 11,091,636 B2
(45) Date of Patent: Aug. 17, 2021

(54) LIQUID SILICONE COMPOSITION FOR TRANSFER- OR INJECTION-MOLDING OPTICAL PARTS, OPTICAL PARTS MADE THEREFROM, AND A METHOD THEREOF

(71) Applicants: DOW SILICONES CORPORATION, Midland, MI (US); DOW TORAY CO., LTD., Tokyo (JP)

(72) Inventors: Jong-Chan Park, Cheongju-si (KR); Min-Hee Kwon, Haman-si (KR); Yutaka Oka, Ichihara (JP)

(73) Assignees: DOW SILICONES CORPORATION, Midland, MI (US); DOW TORAY CO., LTD., Tokyo (JP)

( * ) Notice: Subject to any disclaimer, the term of this patent is extended or adjusted under 35 U.S.C. 154(b) by 89 days.

(21) Appl. No.: 16/623,509

(22) PCT Filed: Jun. 19, 2018

(86) PCT No.: PCT/KR2018/006910
§ 371 (c)(1),
(2) Date: Dec. 17, 2019

(87) PCT Pub. No.: WO2018/236127
PCT Pub. Date: Dec. 27, 2018

(65) Prior Publication Data
US 2020/0392334 A1    Dec. 17, 2020

(30) Foreign Application Priority Data

Jun. 19, 2017    (KR) ........................ 10-2017-0077478

(51) Int. Cl.
*C08L 83/04*    (2006.01)
(52) U.S. Cl.
CPC .................................. *C08L 83/04* (2013.01)
(58) Field of Classification Search
CPC ........ C08G 77/12; C08G 77/20; C08G 77/80; C08G 77/70; C08L 83/04
See application file for complete search history.

(56) References Cited

U.S. PATENT DOCUMENTS

| | | | |
|---|---|---|---|
| 5,998,548 A | 12/1999 | Brennenstuhl et al. | |
| 2009/0099321 A1 | 4/2009 | Yoshitake et al. | |
| 2014/0235806 A1 | 8/2014 | Miyamoto et al. | |
| 2014/0377570 A1 | 12/2014 | Hirai et al. | |
| 2015/0284514 A1* | 10/2015 | Kobayashi | C09D 183/04 428/447 |

FOREIGN PATENT DOCUMENTS

| | | |
|---|---|---|
| CN | 103814087 A | 5/2014 |
| EP | 2565949 A2 | 3/2013 |
| EP | 2878634 A1 | 6/2015 |
| EP | 3059284 A1 | 8/2016 |
| JP | S59232146 A | 12/1984 |
| JP | H0455471 A | 2/1992 |
| JP | 2007231173 A | 9/2007 |
| JP | 4883270 B2 | 2/2012 |
| KR | 1020160092216 A | 8/2016 |
| WO | 2007100445 A2 | 9/2007 |
| WO | 2007132910 A1 | 11/2007 |
| WO | 2007132932 A1 | 11/2007 |

OTHER PUBLICATIONS

International Search Report for PCT/KR2018/006910 dated Oct. 2, 2018, 4 pages.
Machine assisted English translation of JPS59232146A obtained from https://worldwide.espacenet.com on Dec. 10, 2019, 5 pages.
Machine assisted English translation of JPH0455471A obtained from https://worldwide.espacenet.com on Dec. 10, 2019, 10 pages.
Machine assisted English translation of JP4883270B2 obtained from https://patents.google.com on Dec. 10, 2019, 8 pages.
Machine assisted English translation of KR1020160092216A obtained from https://patents.google.com on Dec. 10, 2019, 12 pages.

* cited by examiner

*Primary Examiner* — Kuo Liang Peng
(74) *Attorney, Agent, or Firm* — Warner Norcross + Judd LLP

(57) ABSTRACT

Disclosed is a liquid silicone composition for transfer- or injection-molding optical parts. The liquid silicone composition comprises: (A) a linear organopolysiloxane having in a molecule at least two silicon-bonded $C_{2-10}$ alkenyl groups and at least one silicon-bonded $C_{6-20}$ aryl group; (B) an organopolysiloxane resin represented by a specific average unit formula; (C) an organopolysiloxane having at least two silicon-bonded hydrogen atoms in a molecule; (D) a hydrosilylation reaction catalyst; and (E) a hydrosilylation reaction inhibitor.

7 Claims, No Drawings

LIQUID SILICONE COMPOSITION FOR TRANSFER- OR INJECTION-MOLDING OPTICAL PARTS, OPTICAL PARTS MADE THEREFROM, AND A METHOD THEREOF

CROSS-REFERENCE TO RELATED APPLICATIONS

This application is the National Stage of International Appl. No. PCT/KR2018/006910 filed on 19 Jun. 2018, which claims priority to and all advantages of Korean Appl. No. 10-2017-0077478 filed on 19 Jun. 2017, the content of which is hereby incorporated by reference.

TECHNICAL FIELD

The present invention relates to a liquid silicone composition for transfer- or injection-molding optical parts, transfer- or injection-molding optical parts made therefrom, and a method of transfer- or injection-molding optical parts using the composition.

BACKGROUND ART

Silicone compositions are known for their excellent properties such as resistance to heat and to cold, electrical insulation properties, weatherproof properties, repellency of water, transparency, and the like. Due to these properties, the compositions find wide applications in various industries. Silicone compositions would be molded by various kinds of molding methods such as transfer-molding, injection-molding, etc. Further, since the silicone compositions are superior to other organic materials with regard to their color change and deterioration of physical properties, it is expected that such compositions will find use as a material for optical parts.

For example, JP Patent Publication No. 4883270, JP Patent Application Laid-open Nos. (Hei)4-55471 and (Sho) 59-232146, etc., disclose a silicone composition for molding. However, the silicon products molded by the silicone compositions disclosed in these references relate to a semiconductor field or opaque silicones, and thus there are no disclosures of examples using the compositions as a material for optical components such as lens.

Furthermore, the silicone composition with a low refraction index discloses in these references has a problem that the silicone product has poor resistance to scratching. While, the silicone composition with a high refraction index discloses in these reference has also a problem that the silicone product has a tendency to cause defects such as void, etc.

DISCLOSURE OF INVENTION

Technical Problem

It is an object of the present invention to provide a liquid silicone composition for transfer- or injection-molding optical parts. Further, it is another object of the present invention to provide transfer- or injection-molding optical parts using the liquid silicone composition, which have a high refraction index and a low rate of defected products. In addition, it is another object of the present invention to provide a method of transfer- or injection-molding optical parts using the liquid silicone composition.

Solution to Problem

A liquid silicone composition of the present invention for preparing transfer- or injection-molding optical parts comprises:

(A) a linear organopolysiloxane having in a molecule at least two silicon-bonded $C_{2-10}$ alkenyl groups and at least one silicon-bonded $C_{6-20}$ aryl group;

(B) an organopolysiloxane resin represented by the average unit formula:

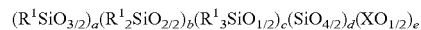

$(R^1SiO_{3/2})_a(R^1{}_2SiO_{2/2})_b(R^1{}_3SiO_{1/2})_c(SiO_{4/2})_d(XO_{1/2})_e$ wherein each $R^1$ is $C_{1-10}$ alkyl group, $C_{2-10}$ alkenyl group, or $C_{6-20}$ aryl group, 0.1 to 40 mol % of $R^1$ are alkenyl groups, and at least 10 mol % of $R^1$ are aryl groups; X is a hydrogen atom or $C_{1-4}$ alkyl group; and "a" is a positive number, "b" is 0 or a positive number, "c" is 0 or a positive number, "d" is 0 or a positive number, "e" is 0 or a positive number, "b/a" is a number between 0 and 10, "c/a" is a number between 0 and 0.5, "d/(a+b+c+d)" is a number between 0 and 0.3, and "e/(a+b+c+d)" is a number between 0 and 0.4;

(C) an organopolysiloxane having at least two silicon-bonded hydrogen atoms in a molecule, in a quantity that provides from 0.1 to 10 moles silicon-bonded hydrogen atoms in this component per 1 mole of the total alkenyl groups in components (A) and (B);

(D) a hydrosilylation reaction catalyst; and (E) a hydrosilylation reaction inhibitor, wherein a viscosity at 25° C. of this composition is from 25,000 to 50,000 mPa·s, and scorch time [ts1] as measured by a Moving Die Rheometer (MDR) at 120° C. is from 10 to 50 sec.

The transfer- or injection-molding optical parts of the present invention are provided by performing a hydrosilylation reaction of the liquid silicone composition.

In the transfer- or injection-molding method of optical parts of the present invention, the liquid silicone composition is used.

Advantageous Effects of Invention

The liquid silicone composition of the present invention can produce transfer- or injection-molding optical parts by performing a hydrosilylation reaction. The transfer- or injection-molding optical parts of the present invention have properties of a high refraction index and a low rate of defected products.

Mode for the Invention

Hereafter, the liquid silicone composition of the present invention is disclosed.

Component (A) is a linear organopolysiloxane having in a molecule at least two silicon-bonded $C_{2-10}$ alkenyl groups and at least one silicon-bonded $C_{6-20}$ aryl group.

Alkenyl groups contained in component (A) can be represented by vinyl, allyl, butenyl, pentenyl, and hexenyl groups. The most preferable are vinyl groups. Aryl groups contained in component (A) can be represented by phenyl, tolyl, xylyl, and naphthyl groups. The most preferable are phenyl groups. Organic groups other than alkenyl and aryl groups that are silicon-bonded and can be used in component (A) can include substituted or unsubstituted monovalent hydrocarbon groups such as methyl, ethyl, propyl, butyl, pentyl, hexyl, heptyl, or similar alkyl groups; benzyl, phenethyl, or similar aralkyl groups; chloromethyl, 3-chloropropyl, 3,3,3-trifluoropropyl, or similar halogenated alkyl groups, among which most preferable are methyl groups.

In order to reduce damping of light under the effect of such phenomena as diffraction, reflection, scattering, etc., that may occur in a cured body obtained from the composition of the present invention, it is recommended that the amount of silicon-bonded aryl groups among the silicon-bonded organic groups contained in component (A) be not less than 40 mol %, preferably not less than 45 mol %. Although there are no special restrictions with regard to viscosity of component (A) at 25° C., it is recommended that the viscosity be 10 to 1,000,000 mPa·s, preferably 100 to 50,000 mPa·s. If the viscosity is in the range of the recommended lower limit or higher, the obtained cured product shows high mechanical strength, and if the viscosity is in the range of the recommended upper limit or lower, the handling property of the obtained cured product is favorable.

As for component (A), an organopolysiloxane of the following formula 1 is preferable.

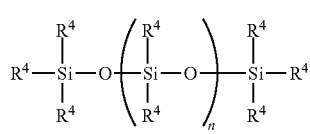

[Formula 1]

wherein, each $R^4$ is substituted or unsubstituted monovalent hydrocarbon groups, specific examples of which include the aforementioned alkyl groups, alkenyl groups, aryl groups, aralkyl groups, and halogenated alkyl groups, however, with a proviso that at least two $R^4$'s in a molecule are the aforementioned alkenyl groups and at least one $R^4$ in a molecule is one of the aforementioned aryl groups. Further, in formula 1, "n" is an integer of 5 to 1,000, and preferably an integer enabling the present organopolysiloxane to have a viscosity in the range of 10 to 1,000,000 mPa·s, and particularly preferably 100 to 50,000 mPa·s.

The content of component (A) is in a range of 10 to 30% by mass based on the total mass of the composition, and preferably 15 to 20% by mass. If the content of component (A) is in the recommended range, a cured body has a suitable mechanical strength and a superior releasing property while released from a mold.

Component (B) is a component used in imparting mechanical strength and high resistance to scratching to a cured product obtained by curing the composition of the present invention. Component (B) is an organopolysiloxane resin represented by the following average unit formula:

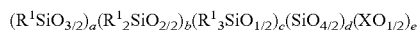

wherein each $R^1$ is $C_{1-10}$ alkyl group, $C_{2-10}$ alkenyl group, or $C_{6-20}$ aryl group, 0.1 to 40 mol % of $R^1$ are alkenyl groups, and at least 10 mol % of $R^1$ are aryl groups. If the content of the alkenyl groups is in an amount of the lower limit or higher and the upper limit or lower of the recommended range, a good reactivity with component (C) is exhibited. Further, in a cured product obtained by curing the composition, in order to reduce the loss of light passing through the cured body of the composition due to diffraction, refraction, scattering, etc., it is required that at least 10 mol % of all $R^1$ should be aryl groups, and particularly in siloxane units represented by formula $R^1SiO_{3/2}$, at least 30 mol % of $R^1$ should be aryl groups, and $R^1$ other than alkenyl and aryl groups is preferably a methyl group.

X is a hydrogen atom or $C_{1-4}$ alkyl group, and most preferably a methyl group.

"a" is a positive number, "b" is 0 or a positive number, "c" is 0 or a positive number, "d" is 0 or a positive number, "e" is 0 or a positive number, "b/a" is a number between 0 and 10, "c/a" is a number between 0 and 0.5, "d/(a+b+c+d)" is a number between 0 and 0.3, and "e/(a+b+c+d)" is a number between 0 and 0.4.

Although there are no limitations concerning the molecular weight of component (B), when converted to standard polystyrene, its weight-average molecular weight (Mw) should preferably be in the range of from 500 to 10,000, and, especially preferably, 700 to 3,000.

The content of component (B) is in a range of 40 to 85% by mass based on the total mass of the composition, and preferably 50 to 75% by mass. If the content of component (B) is in the recommended range, a cured body has a suitable mechanical strength and a superior releasing property while released from a mold.

Furthermore, the weight ratio (A/B) of component (A) to component (B) is preferably from 0.1 to 0.6, and more preferably from 0.2 to 0.4. If the weight ratio of component (A) to component (B) is in the recommended range, a cured body has a suitable mechanical strength and a superior releasing property while released from a mold.

Component (C) is an organopolysiloxane having at least two silicon-bonded hydrogen atoms in a molecule, which serves as a crosslinking agent inducing a hydrosilylation reaction of alkenyl groups in components (A) and (B).

The organic silicon-bonded groups of component (C) are the aforementioned alkyl groups, aryl groups, aralkyl groups, halogenated alkyl groups, and similar substituted or unsubstituted monovalent hydrocarbon groups besides alkenyl groups. Among them, alkyl groups and aryl groups, particularly, methyl groups and phenyl groups are preferable. Although there are no special restrictions with regard to the phase of component (C), it is preferable to be present in a liquid or solid state at 25° C. The most preferable state is liquid of which the viscosity is 0.1 to 1,000,000,000 mPa·s.

The molecular structure of component (C) may have a linear chain, partially-branched chain, branched chain, or net-like structure. In order to impart better mechanical strength and resistance to scratching to a cured product, a branched chain structure is preferable.

It is preferable that component (C) comprises the following components (C-1) and (C-2).

Component (C-1) is an organopolysiloxane presented by the following average compositional formula:

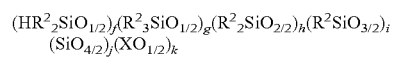

wherein $R^2$ is each independently $C_{1-10}$ alkyl group or $C_{6-20}$ aryl group.

X is a hydrogen atom or $C_{1-4}$ alkyl group.

"f", "g", "h", "i", "j", and "k" are numbers that satisfy the following conditions: 0.4≤f≤0.7; 0≤g≤0.2; 0≤h≤0.05; 0≤i≤0.5; 0≤j≤0.6; 0≤k≤0.05; and f+g+h+i+j=1.

Further, component (C-2) is an organopolysiloxane represented by the following average molecular formula:

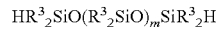

wherein $R^3$ is each independently $C_{1-10}$ alkyl group or $C_{6-20}$ aryl group.

"m" is a number in the range of 1 to 100.

When component (C) comprises components (C-1) and (C-2), the weight ratio (C-1/C-2) of component (C-1) to component (C-2) is preferably 0.01 to 1.00, and more preferably 0.3 to 0.7. With the weight ratio of component (C-1) to component (C-2) to be within the recommended range, the liquid silicone composition of the present invention is cured so as to form a silicone cured product having a type D durometer hardness as specified in ASTM D2240 of from 30 to 70 and elongation of from 30 to 50%. If the hardness of the cured product is in the recommended range, it is possible to reduce the rate of defects such as adhesion to mold, etc., of the optical parts prepared from the liquid silicone composition of the present invention. Further, it is possible to reduce the rate of defects such as chip-out, flash, etc., of the optical parts prepared from the liquid silicone composition of the present invention if the elongation of the cured product is in the recommended range.

Although there are no limitations concerning the molecular weight of component (C), when converted to standard polystyrene, its weight-average molecular weight (Mw) should preferably be in the range of from 300 to 10,000, and, especially preferably, 700 to 3,000.

Component (C) can be used in an amount of 1 to 200 parts by weight based on 100 parts by weight of the sum of components (A) and (B). If the amount of component (C) is the recommended lower limit or higher, it is possible to provide sufficient curing of the composition. If component (C) is used in an amount of the recommended upper limit or lower, the cured product will have sufficient thermal resistance.

For such reasons, the amount of component (C) in the composition provides from 0.1 to 10 moles, more preferably 0.1 to 5 moles, and even more preferably 0.5 to 5 moles, silicon-bonded hydrogen atoms in this component per 1 mole of the total alkenyl groups in components (A) and (B).

Component (D) is a hydrosilylation catalyst which is used for accelerating the hydrosilylation reaction between silicon-bonded hydrogen atoms of component (C) and alkenyl groups contained in components (A) and (B). Component (D) may include a platinum-based catalyst, rhodium-based catalyst, or palladium-based catalyst. The platinum-based catalyst is preferable since it remarkably accelerates curing of the composition. The platinum-based catalyst can be exemplified by a platinum fine powder, chloroplatinic acid, alcoholic solution of the chloroplatinic acid, a platinum-alkenylsiloxane complex, platinum-olefin complex, or platinum-carbonyl complex, among which the platinum-alkenylsiloxane complex is preferable. Such an alkenylsiloxane can be exemplified by 1,3-divinyl-1,1,3,3-tetramethyl disiloxane; 1,3,5,7-tetramethyl-1,3,5,7-tetravinyl cyclotetrasiloxane; substituted alkenylsiloxane which is the aforementioned alkenylsiloxane having a part of methyl groups substituted with ethyl and phenyl groups; or substituted alkenylsiloxane which is the aforementioned alkenylsiloxane having a part of vinyl groups substituted with aryl, hexenyl, or similar groups. From the viewpoint of better stability of the platinum-alkenylsiloxane complexes, the use of 1,3-divinyl-1,1,3,3-tetramethyl disiloxane is preferable.

For further improvement of stability, the aforementioned alkenylsiloxane complexes can be combined with 1,3-divinyl-1,1,3,3-tetramethyl disiloxane, 1,3-diallyl-1,1,3,3-tetramethyl disiloxane, 1,3-divinyl-1,1,3,3-tetraphenyl disiloxane, 1,3,5,7-tetramethyl-1,3,5,7-tetravinyl cyclotetrasiloxane, or a similar alkenylsiloxane, dimethylsiloxane oligomer, or other organosiloxane oligomers. Most preferable are alkenylsiloxanes.

Component (D) is added in an amount sufficient for curing the composition. More specifically, in terms of mass units, the above component is added in an amount of 0.01 to 500 ppm, preferably 0.01 to 100 ppm, and most preferably 0.01 to 50 ppm of the metal atoms of this component per mass of the composition. If component (D) is in an amount of the recommended lower limit or higher, the composition can be reacted to a sufficient degree. If, on the other hand, component (D) is in an amount of the recommended upper limit or lower, it is possible to prevent the coloring of a cured product of the composition.

Component (E), which is a hydrosilylation reaction inhibitor, may include, for example, 2-methyl-3-butyn-2-ol, 3,5-dimethyl-1-hexyn-3-ol, 2-phenyl-3-butyn-2-ol, or similar alkynyl alcohols; 3-methyl-3-penten-1-yne, 3,5-dimethyl-3-hexen-1-yne, or similar enyne compounds; 1,3,5,7-tetramethyl-1,3,5,7-tetravinyl cyclotetrasiloxane, 1,3,5,7-tetramethyl-1,3,5,7-tetrahexenyl cyclotetrasiloxane, benzotriazole, or similar materials. There is no special restriction with regard to the amount of component (E), but it is recommended to add component (E) in an amount of 0.0001 to 5 parts by mass for each 100 parts by mass of the sum of the composition.

Further, the weight ratio (E/D) of component (E) to component (D) is preferably from 1 to 30, and more preferably from 5 to 15, wherein the weight of component (D) is based on the total weight of component (D), not based on the amount of the metal atoms. If the weight ratio of component (E) to component (D) is within the recommended range, it is possible to reduce the rate of defects in molding through a desired reaction rate.

If necessary, the present liquid silicone composition may comprise an optional component such as a phosphor, which is comprised for wavelength conversion of the product prepared by the composition according to the present invention. The kind of phosphor is not particularly limited, but may include any of those known in the art. In one embodiment, the phosphor is made from a host material and an activator, e.g., copper-activated zinc sulfide and silver-activated zinc sulfide. Suitable host materials include, but are not limited thereto, oxides, nitrides, and oxynitrides, sulfides, selenides, halides, or silicates of zinc, cadmium, manganese, aluminum, silicon, or various rare earth metals. Additional suitable phosphors include $Zn_2SiO_4$:Mn (Willemite); ZnS:Ag+(Zn,Cd)S:Ag; ZnS:Ag+ZnS:Cu+$Y_2O_2S$:Eu; ZnO:Zn; KCl; ZnS:Ag,Cl or ZnS:Zn; (KF, $MgF_2$):Mn; (Zn,Cd)S:Ag or (Zn,Cd)S:Cu; $Y_2O_2S$:Eu+$Fe_2O_3$, ZnS:Cu,Al; ZnS:Ag+Co-on-$Al_2O_3$; (KF,$MgF_2$):Mn; (Zn,Cd)S:Cu,Cl; ZnS:Cu or ZnS:Cu,Ag; $MgF_2$:Mn; (Zn,Mg)$F_2$:Mn; $Zn_2SiO_4$:Mn,As; ZnS:Ag+(Zn,Cd)S:Cu; $Gd_2O_2$S:Tb; $Y_2O_2S$:Tb; $Y_3Al_5O_{12}$:Ce; $Y_2SiO_5$:Ce; $Y_3Al_5O_{12}$:Tb; ZnS:Ag,Al; ZnS:Ag; ZnS:Cu,Al or ZnS:Cu,Au,Al; (Zn,Cd)S:Cu,Cl+(Zn,Cd)S:Ag,Cl; $Y_2SiO_5$:Tb; $Y_2OS$:Tb; $Y_3$(Al,Ga)$_5$ $O_{12}$:Ce; $Y_3$(Al,Ga)$_5O_{12}$:Tb; $InBO_3$:Tb; $InBO_3$:Eu; $InBO_3$:Tb+$InBO_3$:Eu; $InBO_3$:Tb+$InBO_3$:Eu+ZnS:Ag; (Ba,Eu)$Mg_2Al_{16}O_{27}$; (Ce,Tb)$MgAl_{11}O_{19}$; $BaMgAl_{10}O_{17}$:Eu, Mn; $BaMg_2Al_{16}O_{27}$:Eu(II); $BaMgAl_{10}O_{17}$:Eu,Mn; $BaMg_2Al_{16}O_{27}$:Eu(II),Mn(II); $Ce_{0.67}Tb_{0.33}MgAl_{11}O_{19}$:Ce, Tb; $Zn_2SiO_4$:Mn,$Sb_2O_3$; $CaSiO_3$:Pb,Mn; $CaWO_4$ (Scheelite); $CaWO_4$:Pb; $MgWO_4$; (Sr,Eu,Ba,Ca)$_5$(PO$_4$)$_3$Cl; $Sr_5$Cl (PO$_4$)$_3$:Eu(II); (Ca,Sr,Ba)$_3$(PO$_4$)$_2Cl_2$:Eu; (Sr,Ca,Ba)$_{10}$ (PO$_4$)$_6$ $Cl_2$:Eu; $Sr_2P_2O_7$:Sn(II); $Sr_6P_5BO_{20}$:Eu; $Ca_5F$(PO$_4$)$_3$:Sb; (Ba,Ti)$_2P_2$ $O_7$:Ti; $3Sr_3$(PO$_4$)$_2$·$SrF_2$:Sb,Mn; $Sr_5F$(PO$_4$)$_3$:Sb,Mn; $Sr_5F$(PO$_4$)$_3$:Sb,Mn; $LaPO_4$:Ce,Tb; (La,Ce,Tb)PO$_4$; (La,Ce,Tb)PO$_4$:Ce,Tb; $Ca_3$(PO$_4$)$_2$·$CaF_2$:Ce,Mn; (Ca,Zn,Mg)$_3$ (PO$_4$)$_2$:Sn; (Zn,Sr)$_3$(PO$_4$)$_2$:Mn; (Sr,Mg)$_3$ (PO$_4$)$_2$:Sn; (Sr,Mg)$_3$(PO$_4$)$_2$:Sn(II); $Ca_5F$(PO$_4$)$_3$:Sb,Mn; $Ca_5$(F,Cl)(PO$_4$)$_3$:Sb,Mn; (Y,Eu)$_2O_3$; $Y_2O_3$:Eu(III); $Mg_4$(F)$GeO_6$:Mn; $Mg_4$(F)(Ge,Sn)$O_6$:Mn; Y(P,V)$O_4$:Eu; $YVO_4$:Eu; $Y_2O_2S$:Eu; 3.5 MgO·0.5 $MgF_2$—$GeO_2$:Mn; $Mg_5As_2O_{11}$: Mn; $SrAl_2O_7$:Pb; $LaMgAl_{11}O_{19}$:Ce; $LaPO_4$:Ce; $SrAl_{12}O_{19}$: Ce; $BaSi_2O_5$:Pb; $SrFB_2O_3$:Eu(II); $SrB_4O_7$:Eu; $Sr_2MgSi_2O_7$: Pb; $MgGa_2O_4$:Mn(II); $Gd_2O_2S$:Tb; $Gd_2O_2S$:Eu; $Gd_2O_2S$: Pr; $Gd_2O_2S$:Pr,Ce,F; $Y_2O_2S$:Tb; $Y_2O_2S$:Eu; $Y_2O_2S$:Pr; Zn(0.5)Cd(0.4)S:Ag; Zn(0.4)Cd(0.6)S:Ag; $CdWO_4$;

CaWO$_4$; MgWO$_4$; Y$_2$SiO$_5$:Ce; YAlO$_3$:Ce; Y$_3$Al$_5$O$_{12}$:Ce; Y$_3$(Al,Ga)$_5$O$_{12}$:Ce; CdS:In; ZnO:Ga; ZnO:Zn; (Zn,Cd)S: Cu,Al; ZnS:Cu,Al, Au; ZnCdS:Ag,Cu; ZnS:Ag; anthracene, EJ-212, Zn$_2$SiO$_4$:Mn; ZnS:Cu; NaI:Tl; CsI:Tl; LiF/ZnS:Ag; LiF/ZnSCu,Al, Au, and combinations thereof, but are not limited thereto.

There are no special restrictions with regard to the amount of a phosphor or a fluorescent material which can be added to the composition, but it is preferable to add this component in an amount of 10 to 400 parts by mass per 100 parts by mass of the sum of components (A) to (E). If the amount of a phosphor or a fluorescent material is in the range of the recommended lower limit or more, it is possible to obtain the wavelength conversion effect.

Within the ranges not contradictory to the object of the invention, the liquid silicone composition of the present invention may include silica, glass, alumina, zinc oxide, or other inorganic fillers; a powdered polymethacrylate resin, or other fine organic resin powders; as well as heat-resistant agents, dyes, pigments, flame retardants, a release agent, etc.

The liquid silicone composition of the present invention is reacted at room temperature or by heating. However, for acceleration of the curing process, heating is recommended. The heating temperature is in the range of 50 to 200° C., and preferably 100 to 150° C.

Further, the liquid silicone composition of the present invention has a viscosity of 25,000 to 50,000 mPa·s at 25° C. Within the recommended range of the viscosity, it is possible to reduce the rate of defects such as leakage, void, short shot, or the like in the optical parts produced from the liquid silicone composition of the present invention.

Furthermore, the liquid silicone composition of the present invention has a scorch time (ts1) of 10 to 50 sec., preferably, of 10 to 45 sec., of 15 to 50 sec., of 15 to 45 sec., or of 15 to 40 sec., as measured by a Moving Die Rheometer (MDR) at 120° C. It is possible to reduce the rate of defects such as void, etc., of the optical parts prepared from the liquid silicone composition of the present invention if the scorch time is in the recommended range.

The scorch time is measured by a Moving Die Rheometer (MDR) at a molding temperature of 120° C. Here, the scorch time is a value obtained by measurement with an MDR in accordance with ASTM D5289-12 "Standard Test Method for Rubber Property—Vulcanization Using Rotorless Cure Meters", and the initial torque value is a torque value obtained immediately after the vulcanization.

A method of controlling the scorch time is not limited, however, it is exemplified by an adjustment of the content of component (D) or component (E), an adjustment of the weight ratio (E/D) of component (E) to component (D), and a selection of component (C).

The transfer- or injection-molding optical parts are obtained by performing a hydrosilylation reaction of the liquid silicone composition.

A representative example of optical parts may include a lens, but is not limited thereto.

The optical parts produced by using the liquid silicone composition of the present invention can have a higher refraction index than when using the compositions of prior arts, i.e., 1.5 or higher, preferably 1.53 or higher, and more preferably 1.54 or higher, and can lower the rate of defective products.

Failure modes include leakage, void, short shot, chip out, flash, adhesion to mold, releasing of molded articles, uncured state, etc.

Leakage in failure modes that occur at the time of molding optical parts, e.g., lens, is associated with the viscosity of a liquid silicone composition. Void is related to the viscosity and the curing rate of a liquid silicone composition. Short shot is associated with the viscosity of a liquid silicone composition. Chip-out and flash are related to the elongation of a silicone cured product. Adhesion to mold is connected with the hardness of a silicone cured product. The rate of defective products can be lowered by optimizing the viscosity and the curing rate of a liquid silicone composition and the elongation and the hardness of a silicone cured product.

Further, the transfer- or injection-molding method of optical parts according to the present invention comprises the liquid silicone composition.

In the method of transfer- and injection-molding, all of the methods used in prior arts are applicable, other than comprising the liquid silicone composition of the present invention.

Among molding methods, transfer-molding is a main-target molding method, while injection-molding is a sub-target molding method. Transfer-molding corresponds to a batch process and is applied to thermosetting plastics and mainly to small-sized products. Transfer-molding has drawbacks in that there is a limitation on the cavity size in a molding die and it is subject to large losses. Meanwhile, injection-molding corresponds to a continuous process and is applied to thermoplastic plastics and mainly to large-sized products. Injection-molding has a limitation on the cavity number in a molding die, but loss is smaller than in transfer-molding.

EXAMPLES

The liquid silicone composition, optical parts produced therefrom, and molding method of the present invention will be further described in more detail, with reference to examples and comparative examples. The viscosity used in the examples is measured at 25° C. Characteristics of a curable liquid silicone composition and optical parts are measured by the methods described below.

MDR Measurement of a Curable Liquid Silicone Composition

The temperature of a measurement device (Rheometry, MDR 2000P, manufactured by Alpha Technologies) was set to the measurement temperature of 120° C. In order to prevent the test piece from making contact with the dies, thin films (Lumirror produced by Toray Industries, Inc., 25 μm) were made to sandwich the test piece from above and below. A 6 g test piece was set in a disc-shaped hollow part of the die constituted by a fixed lower die and an elevating/lowering upper die. The upper and lower dies were hermetically sealed, and the torque value immediately after being hermetically sealed (curing time of 0 seconds) was recorded as the initial torque value under conditions with a frequency of 1.66 Hz and an oscillating angle of 1°.

Hardness of a Cured Body

A cured body is obtained by heating the curable liquid silicone composition for 1 hour at 150° C. in a hot-air-circulation oven. The hardness of the cured body is measured by means of a type D durometer specified by ASTMD 2240.

Tensile Strength

A cured body having the shape of a dumbbell-type specimen No. 3 according to JIS K 6251 is obtained by heating the curable liquid silicone composition for 1 hour at 150° C. in a hot-air-circulation oven. The tensile strength of the cured body is measured with a procedure specified in JIS K 6251.

Resistance to Scratching

The curable liquid silicone composition is poured onto an aluminum plate (55 mm diameter) so as to form a layer with a 1 mm thickness, and the content of the plate is cured by heating at 150° C. for 1 hour in a hot-air-circulation oven. As a result, a plate-like cured body is formed. The surface of this plate is scratched 10 times with a nail, and then the degree of the surface damage is evaluated. The following designations are used for evaluation criteria: ○-no scratches after 10 times; Δ-scratches after 2 to 10 times; X-scratch after 1 time. Further, the appearance of the sample is observed after treatment for 100 hours at 150° C. in a hot-air-circulation oven.

Index of Refraction through the Curable Liquid Silicone Composition and the Cured Body Index of refraction through the curable liquid silicone composition at 25° C. is measured with the Abbe refractometer. Measurements are carried out with a visible light (589 nm). Subsequently, the curable liquid silicone composition is then cured by heating for 1 hour at 150° C. in a hot-air-circulation oven, and the index of refraction at 25° C. for the light passing through the obtained cured body is measured in the same manner as for the composition.

Visible Light Permeability through the Curable Liquid Silicone Composition and Cured Body Visible light permeability through a curable liquid silicone composition (optical path length of 2.0 mm) at 25° C. is measured. Measurements are carried out with visible light with the wavelength of 420 nm. The curable liquid silicone composition is then cured by heating for 1 hour at 150° C. in a hot-air-circulation oven, and permeability of light through the cured body at 25° C. (optical path length of 2.0 mm) is measured.

Example 1

A liquid silicone composition was prepared by uniformly mixing the following:

relative to 100 parts by weight of the curable liquid silicone composition, 18.69 parts by weight of linear chain methylphenylpolysiloxane having both molecular terminals capped with dimethylvinylsiloxy groups, 68.47 parts by weight of a branched chain organopolysiloxane having the average unit formula: $(C_6H_5SiO_{3/2})_{0.75}[(CH_2=CH)(CH_3)_2SiO_{1/2}]_{0.25}$, 4.20 parts by weight of organopolysiloxane having the average unit formula: $(C_6H_5SiO_{3/2})_{0.60}[(CH_3)_2HSiO_{1/2}]_{0.40}$, 7.79 parts by weight of organopolysiloxane having the formula: $H(CH_3)_2SiO[(C_6H_5)_2SiO]Si(CH_3)_2H$, a complex of platinum with 1,3-divinyl-1,1,3,3-tetramethyldisiloxane in such an amount in which 10 ppm in weight units of metallic platinum is comprised, and 0.85 parts by weight of 2-phenyl-3-butyn-2-ol.

Characteristics of the curable liquid silicone composition and the cured body were measured. The results of measurements were presented in Table 1. Further, lenses were manufactured by using the above-described liquid silicone composition.

Example 2

A liquid silicone composition was prepared by uniformly mixing the following:

relative to 100 parts by weight of the curable liquid silicone composition, 18.69 parts by weight of a linear chain methylphenylpolysiloxane having both molecular terminals capped with dimethylvinylsiloxy groups, 68.47 parts by weight of a branched chain organopolysiloxane having the average unit formula: $(C_6H_5SiO_{3/2})_{0.75}[(CH_2=CH)(CH_3)_2SiO_{1/2}]_{0.25}$, 4.20 parts by weight of an organopolysiloxane having the average unit formula: $(C_6H_5SiO_{3/2})_{0.60}[(CH_3)_2HSiO_{1/2}]_{0.40}$, 7.79 parts by weight of organopolysiloxane having the formula: $H(CH_3)_2SiO[(C_6H_5)_2SiO]Si(CH_3)_2H$, a complex of platinum with 1,3-divinyl-1,1,3,3-tetramethyldisiloxane in such an amount in which 32 ppm in weight units of metallic platinum is comprised, and 0.85 parts by weight of 2-phenyl-3-butyn-2-ol.

Characteristics of the curable liquid silicone composition and the cured body were measured. The results of measurements are presented in Table 1. Further, lenses were manufactured by using the above-described liquid silicone composition.

Example 3

A liquid silicone composition was prepared by uniformly mixing the following:

relative to 100 parts by weight of the curable liquid silicone composition, 22.45 parts by weight of a linear chain methylphenylpolysiloxane having both molecular terminals capped with dimethylvinylsiloxy groups, 64.71 parts by weight of a branched chain organopolysiloxane having the average unit formula: $(C_6H_5SiO_{3/2})_{0.75}[(CH_2=CH)(CH_3)_2SiO_{1/2}]_{0.25}$, 4.20 parts by weight of an organopolysiloxane having the average unit formula: $(C_6H_5SiO_{3/2})_{0.60}[(CH_3)_2HSiO_{1/2}]_{0.40}$, 7.79 parts by weight of organopolysiloxane having the formula: $H(CH_3)_2SiO[(C_6H_5)_2SiO]Si(CH_3)_2H$, a complex of platinum with 1,3-divinyl-1,1,3,3-tetramethyldisiloxane in such an amount in which 32 ppm in weight units of metallic platinum is comprised, and 0.85 parts by weight of 2-phenyl-3-butyn-2-ol.

Characteristics of the curable liquid silicone composition and the cured body were measured. The results of measurements are presented in Table 1. Further, lenses were manufactured by using the above-described liquid silicone composition.

Comparative Example 1

A composition was prepared by uniformly mixing the following:

relative to 100 parts by weight of a curable liquid silicone composition, 63 parts by weight of a linear chain dimethylpolysiloxane having both molecular terminals capped with dimethylvinylsiloxy groups, 30 parts by weight of a branched chain organopolysiloxane having the average unit formula: $(SiO_{4/4})_{0.55}[(CH_2=CH)(CH_3)_2SiO_{1/2}]_{0.45}$, 5 parts by weight of a polymethylhydrogensiloxane end blocked at both molecular chain terminals by trimethylsiloxy groups with a kinematic viscosity of 21 mm$^2$/s and a silicon-bonded hydrogen atom content of 1.57% by mass, a complex of platinum with 1,3-divinyl-1,1,3,3-tetramethyldisiloxane in such an amount in which 32 ppm in weight units of metallic platinum is comprised, and 0.85 parts by weight of 2-phenyl-3-butyn-2-ol.

Characteristics of the curable liquid silicone composition and of the cured body were measured. The results of measurements are presented in Table 1. Further, lenses were manufactured by using the above-described liquid silicone composition.

Comparative Example 2

A liquid silicone composition was prepared by uniformly mixing the following:

relative to 100 parts by weight of the curable liquid silicone composition, 20.39 parts by weight of a linear chain methylphenylpolysiloxane having both molecular terminals capped with dimethylvinylsiloxy groups, 66.77 parts by weight of a branched chain organopolysiloxane having the average unit formula: $(C_6H_5SiO_{3/2})_{0.75}[(CH_2\!\!=\!\!CH)(CH_3)_2SiO_{1/2}]_{0.25}$, 4.20 parts by weight of an organopolysiloxane having the average unit formula: $(C_6H_5SiO_{3/2})_{0.60}[(CH_3)_2HSiO_{1/2}]_{0.40}$, 7.79 parts by weight of organopolysiloxane having the formula: $H(CH_3)_2SiO[(C_6H_5)_2SiO]Si(CH_3)_2H$, a complex of platinum with 1,3-divinyl-1,1,3,3-tetramethyldisiloxane in such an amount in which 6 ppm in weight units of metallic platinum is comprised, and 0.85 parts by weight of 2-phenyl-3-butyn-2-ol.

Characteristics of the curable liquid silicone composition and the cured body were measured. The results of measurements are presented in Table 1. Further, lenses were manufactured by using the above-described liquid silicone composition.

Comparative Example 3

A liquid silicone composition was prepared by uniformly mixing the following:

relative to 100 parts by weight of the curable liquid silicone composition, 20.39 parts by weight of a linear chain methylphenylpolysiloxane having both molecular terminals capped with dimethylvinylsiloxy groups, 66.77 parts by weight of a branched chain organopolysiloxane having the average unit formula: $(C_6H_5SiO_{3/2})_{0.75}[(CH_2\!\!=\!\!CH)(CH_3)_2SiO_{1/2}]_{0.25}$, 4.20 parts by weight of an organopolysiloxane having the average unit formula: $(C_6H_5SiO_{3/2})_{0.60}[(CH_3)_2HSiO_{1/2}]_{0.40}$, 7.79 parts by weight of organopolysiloxane having the formula: $H(CH_3)_2SiO[(C_6H_5)_2SiO]Si(CH_3)_2H$, a complex of platinum with 1,3-divinyl-1,1,3,3-tetramethyldisiloxane in such an amount in which 46 ppm in weight units of metallic platinum is comprised, and 0.85 parts by weight of 2-phenyl-3-butyn-2-ol.

Characteristics of the curable liquid silicone composition and the cured body were measured. The results of measurements are presented in Table 1. Further, lenses were manufactured by using the above-described liquid silicone composition.

[Preparation Example of Lens]

Lenses were made by means of the conventional transfer-molding method.

By injecting a silicone composition in the liquid state due to high temperature into a cavity in a molding die having an upper die with a port and a lower die with the application of a constant temperature and pressure through a runner of the molding die and by curing the same, lenses were prepared.

The applied pressure was 1.5 bar and the temperature was 120° C.

The results of transfer-molding are shown in Table 1.

TABLE 1

| Characteristics | Examples | | | Comparative Examples | | |
|---|---|---|---|---|---|---|
| | 1 | 2 | 3 | 1 | 2 | 3 |
| Curable Liquid Silicone Composition | | | | | | |
| Index of Refraction | 1.54 | 1.54 | 1.54 | 1.41 | 1.54 | 1.54 |
| Light Permeability (%) (in 2 mm) | 90 | 90 | 90 | 93 | 90 | 90 |
| Viscosity (cps) | 40,000 | 40,000 | 22,000 | 26,000 | 35,000 | 35,000 |
| Scorch time (sec.) at 120° C. | 34 | 18 | 16 | 27 | 51 | 8 |
| Cured Body | | | | | | |
| Hardness (Shore D) | 55 | 55 | 55 | 25 | 50 | 50 |
| Tensile Strength (MPa) | 5.2 | 5.2 | 5.2 | 12.7 | 5.2 | 5.2 |
| Resistance to Scratching | ○ | ○ | ○ | X | ○ | ○ |
| Index of Refraction | 1.54 | 1.54 | 1.54 | 1.41 | 1.54 | 1.54 |
| Light Permeability (%) (in 2 mm) | 90 | 90 | 90 | 93 | 90 | 90 |
| Transfer Molding Process | | | | | | |
| Time of Process (sec) | 150 | 240 | 260 | 180 | 350 | 180 |
| Leakage Area (cm$^2$) | 5.2 | 18 | 77 | 6.2 | 24.3 | 6.1 |
| Short Shot (%) | 2% | 2% | 2% | 2% | 3% | 8% |
| Void (%) | Less than 2% | 5% | 8% | 2% | 12% | 19% |
| Rate of Releasing of Molded Articles(%) | Less than 1% | Less than 1% | Less than 1% | Less than 1% | Less than 1% | Less than 1% |

INDUSTRIAL APPLICABILITY

The curable liquid silicone composition of the present invention is suitable as a material for producing optical parts such as a lens. The optical parts prepared from the composition show a high index of refraction and have an advantage in that they can lower the rate of defected products during the process of preparation.

The invention claimed is:

1. A liquid silicone composition for transfer- or injection-molding optical parts, the liquid silicone composition comprising:
   (A) a linear organopolysiloxane having in a molecule at least two silicon-bonded $C_{2-10}$ alkenyl groups and at least one silicon-bonded $C_{6-20}$ aryl group;
   (B) an organopolysiloxane resin represented by the average unit formula:

$(R^1SiO_{3/2})_a(R^1{}_2SiO_{2/2})_b(R^1{}_3SiO_{1/2})_c(SiO_{4/2})_d(XO_{1/2})_e$ wherein each $R^1$ is $C_{1-10}$ alkyl group, $C_{2-10}$ alkenyl group, or $C_{6-20}$ aryl group, 0.1 to 40 mol % of R are alkenyl groups, and at least 10 mol % of $R^1$ are aryl groups; X is a hydrogen atom or $C_{1-4}$ alkyl group; and "a" is a positive number, "b" is 0 or a positive number, "c" is 0 or a positive number, "d" is 0 or a positive number, "e" is 0 or a positive number, "b/a" is a number between 0 and 10, "c/a" is a number between 0 and 0.5, "d/(a+b+c+d)" is a number between 0 and 0.3, and "e/(a+b+c+d)" is a number between 0 and 0.4;
   (C) an organopolysiloxane having at least two silicon-bonded hydrogen atoms in a molecule, in a quantity that provides from 0.1 to 10 moles silicon-bonded hydrogen atoms in this component per 1 mole of the total alkenyl groups in components (A) and (B);
   (D) a hydrosilylation reaction catalyst; and
   (E) a hydrosilylation reaction inhibitor;
   wherein a viscosity at 25° C. of the liquid silicone composition is from 25,000 to 50,000 mPa·s, and a scorch time [ts1] as measured by a Moving Die Rheometer (MDR) at 120° C. is from 10 to 50 sec.

2. The liquid silicone composition of claim 1, wherein a weight ratio (A/B) of component (A) to component (B) is from 0.1 to 0.6.

3. The liquid silicone composition of claim 1, wherein component (C) comprises the following components (C-1) and (C-2):
   (C-1) an organopolysiloxane presented by the following average compositional formula:

$(HR^2{}_2SiO_{1/2})_f(R^2{}_3SiO_{1/2})_g(R^2{}_2SiO_{2/2})_h(R^2SiO_{3/2})_i$
   $(SiO_{4/2})_j(XO_{1/2})_k$ wherein each $R^2$ is $C_{1-10}$ alkyl group or $C_{6-20}$ aryl group; X is a hydrogen atom or $C_{1-4}$ alkyl group; and "f", "g", "h", "i", "j", and "k" are numbers that satisfy the following conditions: 0.4≤f≤0.7; 0≤g≤0.2; 0≤h≤0.05; 0≤i≤0.5; 0≤j≤0.6; 0≤k≤0.05; and f+g+h+i+j=1;
   (C-2) an organopolysiloxane represented by the following average molecular formula:

$HR^3{}_2SiO(R^3{}_2SiO)_mSiR^3{}_2H$ wherein each $R^3$ is $C_{1-10}$ alkyl group or $C_{6-20}$ aryl group; and "m" is a number in the range of 1 to 100.

4. The liquid silicone composition of claim 1, wherein a weight ratio (D/E) of component (D) to component (E) is from 1 to 30.

5. The liquid silicone composition of claim 1, wherein the composition cures to form a silicone cured product having a type D durometer hardness as specified in ASTM D2240 of from 30 to 70 and an elongation of from 30 to 50%.

6. Transfer- or injection-molding optical parts which are obtained by performing a hydrosilylation reaction of the liquid silicone composition according to claim 1.

7. A method of forming optical parts, the method comprising transfer- or injection-molding the liquid silicone composition according to claim 1.

* * * * *